US009075435B1

(12) United States Patent
Noble et al.

(10) Patent No.: US 9,075,435 B1
(45) Date of Patent: Jul. 7, 2015

(54) CONTEXT-AWARE NOTIFICATIONS

(71) Applicant: Amazon Technologies, Inc., Reno, NV (US)

(72) Inventors: Isaac Scott Noble, Soquel, CA (US); Matthew Paul Bell, Sunol, CA (US); Guenael Thomas Strutt, San Jose, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 89 days.

(21) Appl. No.: 13/867,988

(22) Filed: Apr. 22, 2013

(51) Int. Cl.
*G09G 5/00* (2006.01)
*G06F 3/01* (2006.01)

(52) U.S. Cl.
CPC ...................................... *G06F 3/013* (2013.01)

(58) Field of Classification Search
None
See application file for complete search history.

(56) References Cited

U.S. PATENT DOCUMENTS

| | | | |
|---|---|---|---|
| 6,591,198 B1 * | 7/2003 | Pratt | 702/35 |
| 2008/0211778 A1 * | 9/2008 | Ording et al. | 345/173 |
| 2010/0079508 A1 * | 4/2010 | Hodge et al. | 345/697 |
| 2010/0125816 A1 * | 5/2010 | Bezos | 715/863 |
| 2011/0173681 A1 | 7/2011 | Qureshi et al. | |
| 2012/0064948 A1 * | 3/2012 | Lee et al. | 455/566 |
| 2012/0262582 A1 * | 10/2012 | Kimchi et al. | 348/159 |
| 2014/0013196 A1 | 1/2014 | White | |

OTHER PUBLICATIONS

Features of biteSMS for iOS 4 and Higher, Delicious Inc., Aug. 5, 2011.
ZTE Warp SequentTM User Manual, ZTE Corporation, Jul. 24, 2012.
USPTO Non-Final Office Action dated Aug. 13, 2014, for U.S. Appl. No. 13/627,291, filed Sep. 26, 2012, 19 pages.

* cited by examiner

*Primary Examiner* — Nicholas Lee
(74) *Attorney, Agent, or Firm* — Novak Druce Connolly Bove + Quigg LLP

(57) ABSTRACT

Systems and approaches are provided for presenting incoming notifications to a computing device based on a determined context of the computing device. Various sensors of the device can be used to determine the context of the device with respect to a user, the state of the device itself, or the context of the device with respect to the environment in which the device is situated. The user can then be informed of received notifications in a manner likely to get the user's attention while not being overly obtrusive to the user or others within the vicinity of the user.

19 Claims, 8 Drawing Sheets

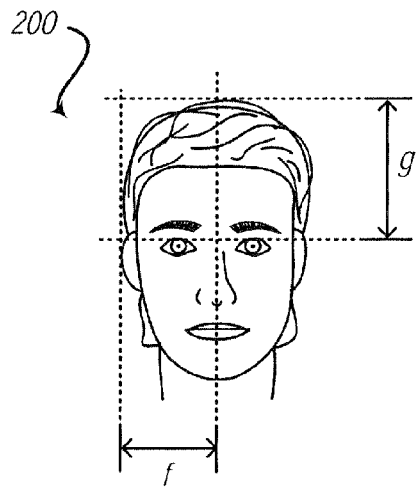
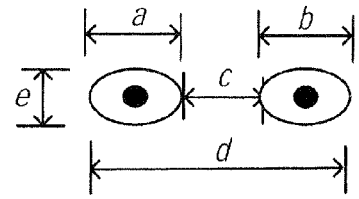
FIG. 2A
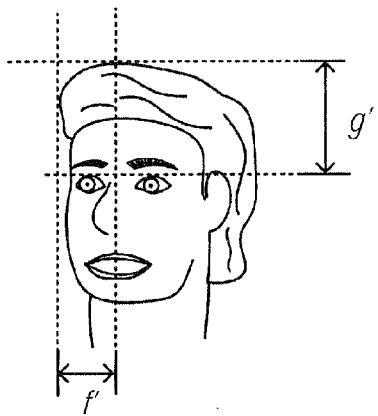
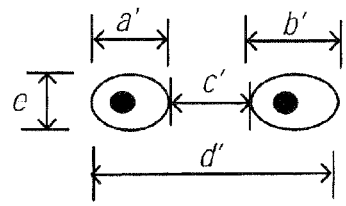
FIG. 2B
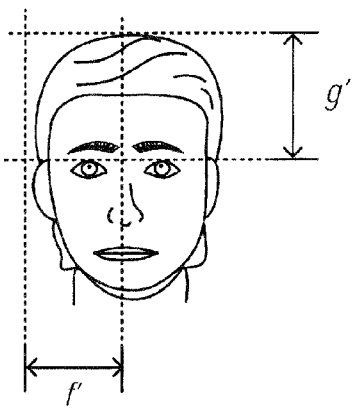
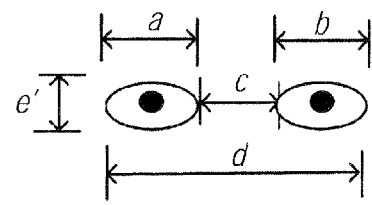
FIG. 2C

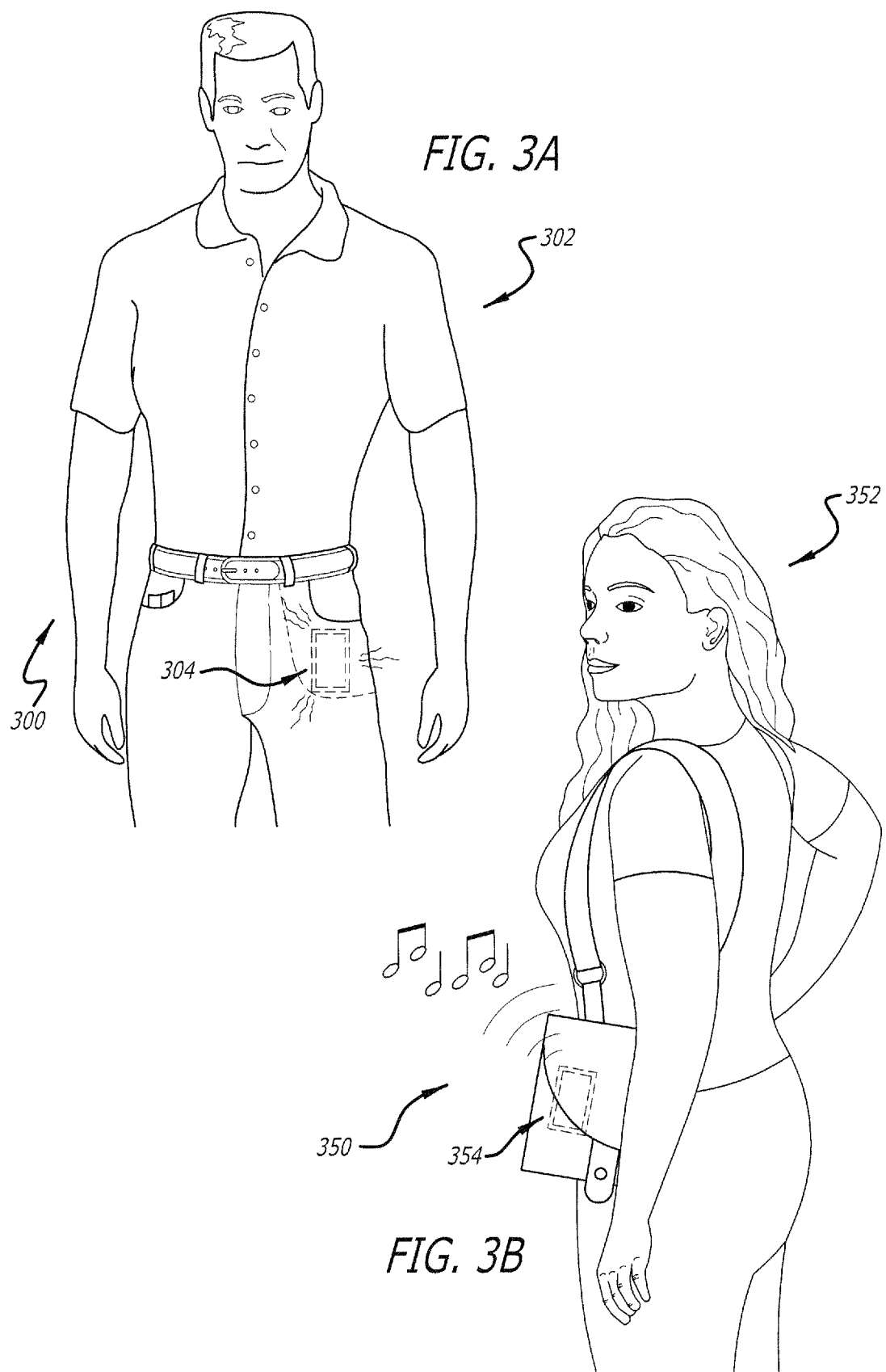

CONTEXT-AWARE NOTIFICATIONS

BACKGROUND

An important feature of many personal computing devices, such as laptop computers, tablets, or smartphones, is the capability of running multiple user applications, often simultaneously. For example, a user may read an electronic book, check her calendar, map a route to a particular destination, take photographs, or play a video game from her personal electronic device. At the same time, the user may receive an email, text message, or social network status or be notified of breaking news, a weather update, traffic congestion, or a sports score from her device. Many user applications operating on personal computing devices are configured to provide such notifications, updates, alerts, messages, and similar communications as unobtrusively as possible because the user may find it annoying and/or frustrating if these communications repeatedly diverted the user from another user application that is the focus of the user's attention. However, there may be occasions that the user will miss a critical notification that is presented in too subtle of a manner or mode. In some devices, the user may configure the device and/or the user application to present notifications more overtly. Although the user may be less likely to miss notifications as a result, such approaches can also have its drawbacks, such as disturbing others in the vicinity of the device. In other circumstances, a user configuration may be equally as ineffective in attracting the user's attention as default settings, such as the user configuring the device and/or user application to emit a ringtone or other audio and the user being situated in a noisy environment when her device receives a notification.

BRIEF DESCRIPTION OF THE DRAWINGS

Various embodiments in accordance with the present disclosure will be described with reference to the drawings, in which:

FIGS. 2A, 2B, and 2C illustrate examples of ways to determine gaze direction that can be utilized in accordance with various embodiments;

FIGS. 3A and 3B illustrate examples of a personal computing device receiving a notification as the device is respectively located in a first user's pocket and a second user's purse in accordance with an embodiment;

DETAILED DESCRIPTION

Figure 1A:
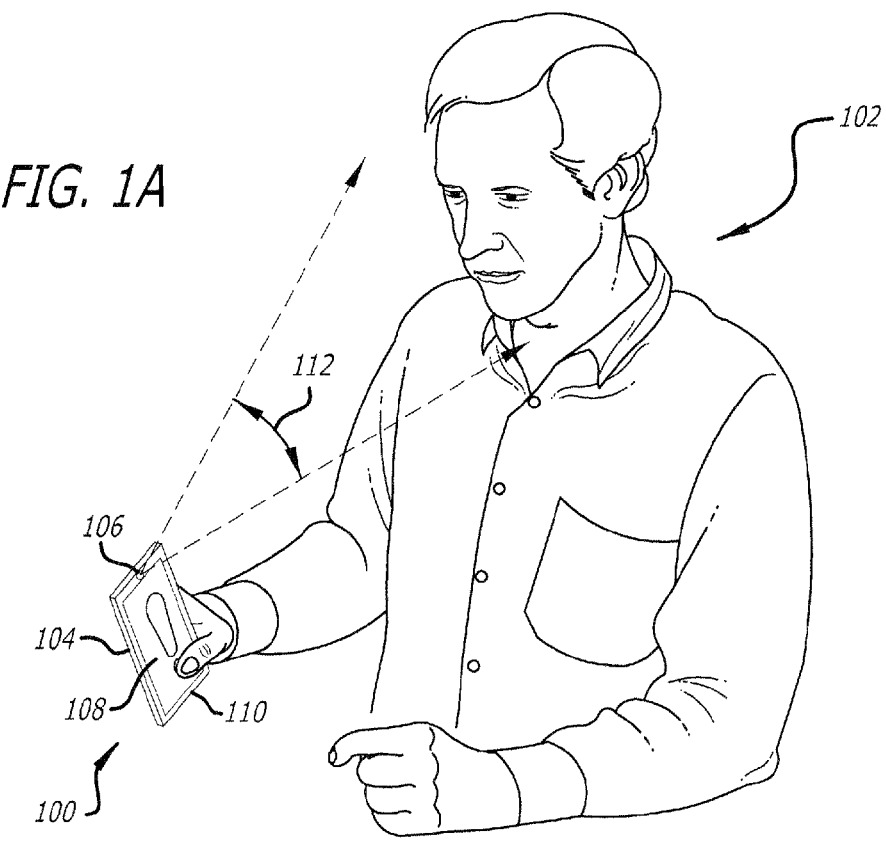
FIGS. 1A and 1B illustrate examples of a personal computing device receiving a notification as a user is respectively viewing a display element of the device and not viewing the display element in accordance with an embodiment.

Systems and methods in accordance with various embodiments of the present disclosure may overcome one or more of the aforementioned and other deficiencies experienced in conventional approaches for presenting information to a user of a computing device. In particular, various embodiments involve receiving a notification (also sometimes referred to as an alert or update) to a computing device, determining a current context of the computing device, and presenting an indication of the notification to the user according to the device context. For example, a camera of a computing device can be used to capture image data to determine that the user is facing a display element of the computing device and the computing device can present a graphical element on the display element to indicate to the user receipt of the notification. If captured image data indicates that the user is not within the vicinity of the device, a speaker of the device may be activated to generate a ringtone, voice indicator, or other audio signal informing the user of the notification. If the computing device detects the presence of the user within the vicinity of the device but determines that the user is not facing the device, the device may generate a ringtone or other audio of a low or intermediate volume and/or vibrate to draw the user's attention to the received notification.

In various embodiments, data captured by one or more of sensors of a computing device can be used to determine the device context and present an incoming notification based on the device context, such as in a manner likely to cause the user of the device to become aware of the notification but not to unduly disturb the user or others within the vicinity of the user. The device context may include information about the state of the computing device with respect to the user as determined by the sensors of the device, such as a distance between the computing device and the user; a position and/or orientation of the device with respect to the user; whether the user is determined to be gazing at a display element of the device; whether the device can be heard or otherwise be sensed by the user (e.g., touchable, graspable); whether the device is located within a user's pocket or a user's purse, bag, backpack, holster, fanny pack, etc.; and other determinable and/or quantifiable characteristics of the device with respect to the user. The device context may also include information about the state of the device itself as measured by the sensors of the device, such as motion of the device, position and/or orientation of the device with respect to a frame of reference other than the user (e.g., such as another user, object, or location), a geolocation of the device, an amount of pressure being applied to the device, and other determinable and/or quantifiable characteristics of the device. Further, the device context can include information about a state of the environment in which the device is located as set forth by the device sensors, such as an amount of ambient noise or light, atmospheric pressure, temperature, and other determinable and/or quantifiable characteristics of the environment.

In some embodiments, data from multiple sensors or other input elements of the computing device can be aggregated to obtain a more accurate and/or detailed understanding of the context of the device. For example, captured image data can be analyzed to determine that the user is not looking at the display element of the device, motion and orientation data captured by inertial sensors can be analyzed to determine that the movement of the device corresponds to a user's gait, and touch sensor data can be analyzed to determine that the user is grasping the device. An indication of a notification can be presented to the user based on the device context. In this example, the device can vibrate in the event of an incoming notification because it is determined that it is likely the user is walking with the device in her hand but not looking at the device. Device vibration is likely to inform the user of the notification due to the physical contact between the device and the user yet would not be obtrusive to the user or others around the user. On the other hand, if analysis of the motion and orientation data of the device determines that device movement corresponds to a user's gait and the touch sensor data indicates that no user is touching the device, it may be assumed that the device is in a pocket or bag of a walking user. In this situation, an audio signal may be more effective in attracting the user's attention than a vibration because of the lack of direct contact between the device and the user.

In some embodiments, a user can customize the manner of presenting indications of notifications received to the device in various ways. For example, the user can associate notifications sent from a family member with a particular ringtone, vibration pattern, flashing light pattern, or some combination thereof. As another example, the user can configure the device to present a notification from a business contact within a modal window, pop-up window, dialog box or other user interface requiring user interaction, such as pressing an "OK" or "Ignore" button, before returning control to a user application running on the device prior to receiving the notification. As yet another example, a default configuration for a device may be to present all notifications as toast notifications that are displayed on screen for ten seconds but the user may reconfigure the device to present notifications corresponding to instant messages for only three seconds.

Various other functions and advantages are described and suggested below in accordance with the various embodiments.

FIG. 1A illustrates an example situation 100 of a user 102 operating a computing device 104 that supports context-aware notifications. Although a portable computing device (e.g., a smart phone, tablet, or portable media player) is shown that can be held in a user's hand, it should be understood that other types of computing devices can utilize aspects of the various embodiments as should be apparent in light of the teachings and suggestions contained herein. The computing device 104 in this example includes a camera 106 positioned on the device such that at least a portion of a user, such as user 102, operating the computing device 104 is captured by camera 106 when the user is within the field of view 112 of the camera. In this example, camera 106 comprises a digital camera incorporating a CMOS image sensor. In other embodiments, a camera of a device can incorporate other types of image sensors (such as a charged couple device (CCD)) and/or can include multiple cameras, including at least one wide-angle optical element, such as a fish eye lens, that enables the camera to capture images over a wide range of angles, such as 180 degrees or more. Further, each camera can comprise a digital still camera, configured to capture subsequent frames in rapid succession, or a video camera able to capture streaming video. In still other embodiments, a computing device can include other types of imaging elements. such as ambient light sensors, infra-red (IR) sensors, and other optical, light, imaging, or photon sensors.

The example device 104 also includes a display screen 108 at the front of the device, on a same surface as the camera 106. It should be understood that, while the components of the example device are shown to be on a "front" of the device, there can be similar or alternative components on the "top," "side," or "back" of the device as well (or instead). Further, directions such as "top," "side," and "back" are used for purposes of explanation and are not intended to require specific orientations unless otherwise stated. The display screen 108 is a touchscreen comprising a plurality of capacitive touch sensors and capable of detecting the user's fingertip touching points of the screen as input for the device. in other embodiments, the display element may implement a different touch technology (e.g. resistive, optical, ultrasonic) or may not be capable of detecting a user's touch at all. The computing device 104 also includes one or more microphones 110 or other audio capture devices capable of capturing audio data, such as words spoken by the user 104 of the device or ambient sound in the vicinity of the device. In this example, the microphone 110 is placed on the same side of the device 100 as the display screen 108, such that the microphone 110 will typically be better able to capture words spoken by a user of the device. In at least some embodiments, the microphone can be a directional microphone that captures sound information from substantially directly in front of the device, and picks up only a limited amount of sound from other directions, which can help to better capture words spoken by a primary user of the device. In other embodiments, a computing device may include multiple microphones to capture 3D audio. In at least some embodiments, a computing device can also include an audio output element, such as internal speakers or one or more ports to support peripheral audio output devices, such as headphones or loudspeakers.

In the example situation 100, the user 104 can be seen viewing the display screen 108 of the computing device 102. The user may be interacting with a user application when the device receives a notification from another computing device (not shown). In other embodiments, notifications may be received from the device itself such as a calendar application configured to send a notification to the user to remind the user of an upcoming event or appointment. Upon receiving the notification, the device 102 is configured to activate the camera 106 to capture image data of subject matter within the field of view 112 of the camera. The device then analyzes the image data to determine whether the user is looking at the display screen 108. The device may use a facial detection algorithm that attempts to recognize any human face in the captured image data, or the device can employ a more complex pupil detection algorithm that attempts to locate the position of the user's pupils and determine whether the user's line of sight is aligned with the display 108. In some embodiments, the device may be able to recognize and differentiate various users and retrieve user preferences for a recognized user. When it is determined that the user 104 is viewing the display screen 108, the device presents a graphical element 114 on the display to inform the user of receipt of the notification.

Notifications are a feature of many operating systems that allow a user application or platform software to keep a user informed about events relating to the application or platform. On certain platforms, notifications are implemented as a lightweight service that handles queuing of messages from an application provider and propagation of the messages to a specific device or multiple devices. A user device may maintain a persistent network connection to the notification service, allowing the notification service to deliver any new notifications promptly to a user application or platform of the device. Likewise, an application provider may maintain a persistent connection to the notification service for similar reasons. A user application may be required to subscribe or register to receive notifications to the notification service. When an event relating to the user application or platform occurs, the application provider or platform provider sends a notification to the notification service (e.g., server to server) and the notification service delivers the notification to the intended recipient device (e.g., server to client). Such a framework is sometimes referred to as a "push" architecture, which reverses the client-server model by having a server initiate a transaction instead of having a client request for information from the server. In certain embodiments, the user application may instead use a traditional "pull" architecture and periodically poll a server for new information. However, a "pull" approach may be less advantageous because it may require the user application to execute in the background, which can use more processing resources and power than desirable. In still other embodiments, notifications may be generated by the device or software running on the device itself without necessarily requiring network communication. For example, system alerts such as low battery power or poor network connectivity or user applications such as alarm clocks, schedulers, and the like may also be presented to the user as notifications.

A notification service may permit an application provider to specify how a notification is to be presented to a user device, such as a "badge notification, "toast notification", "banner notification", "in-line notification", "notification area icon", or similar user interface on a display of the user device. A "badge notification" can refer to a counter that is displayed alongside an application icon that may indicate to the user a number of events occurring since the user last interacted with the application, a number of actions required to be taken by the user, a number of unread communications, and the like. A "toast notification" can refer to a dialog box or modal window that is displayed at the foreground and pushes a currently running application to the background. Some user interaction may be required to return control to the running application, such as pressing an "OK" or "IGNORE" button. A "banner notification" can refer to a user interface element that is typically displayed at a top or bottom of the display of a device (but can be displayed anywhere) and may include preview information such as a photograph of the user sending the underlying message corresponding to the notification, a truncated portion of the underlying message, the user application associated with the notification, etc. The banner may be displayed for a limited period of time, such as ten seconds, before the banner ceases to be displayed. A user interaction, such as tapping or swiping the banner may expand the banner notification to display the entirety of the underlying message. The expanded banner may also enable other user interactions, such as tapping on the notification to activate the user application associated with the notification (or bring the user application to the foreground). As another example, the notification may comprise a calendar event and expanding the banner notification may provide a "snooze" interaction enabling the user to cause the notification to be re-sent to the device after a period of time, such as fifteen minutes. An in-line notification can refer to a notification that is displayed in-line with a currently running user application wherein the user may interact with both the notification and the user application. Approaches for providing in-line notifications are discussed in co-pending U.S. patent application Ser. No. 13/627,291, filed Sep. 26, 2012, entitled "Inline Message Alert," which is hereby incorporated by reference herein. A "notification area icon" may refer to a toolbar icon, system tray icon, status bar icon, or similar user interface that is displayed upon receipt of a notification. Tapping or selecting the icon can launch the user application (or bring the application to the foreground) corresponding to the notification.

Notifications are often employed by communication-related user applications, such as a telephony application, voicemail, email, Short Message Service (SMS) text messaging, instant messaging, or social networking, wherein an application provider will send a user a notification in response to a new communication. Notifications are also commonly utilized by applications that publish frequently updated content, such as news, weather, stock market, or sports applications, Rich Site Summary (RSS) feeds, blogs, or social networking applications. Notifications can also be used by online banking or other financial applications to report the financial transactions made to the user's account, games to apprise the user of events in the gaming world, scheduling and calendar applications to remind the user of upcoming events, etc. An operating system and user applications may also use notifications to inform the user of software updates or system status.

Figure 1B:
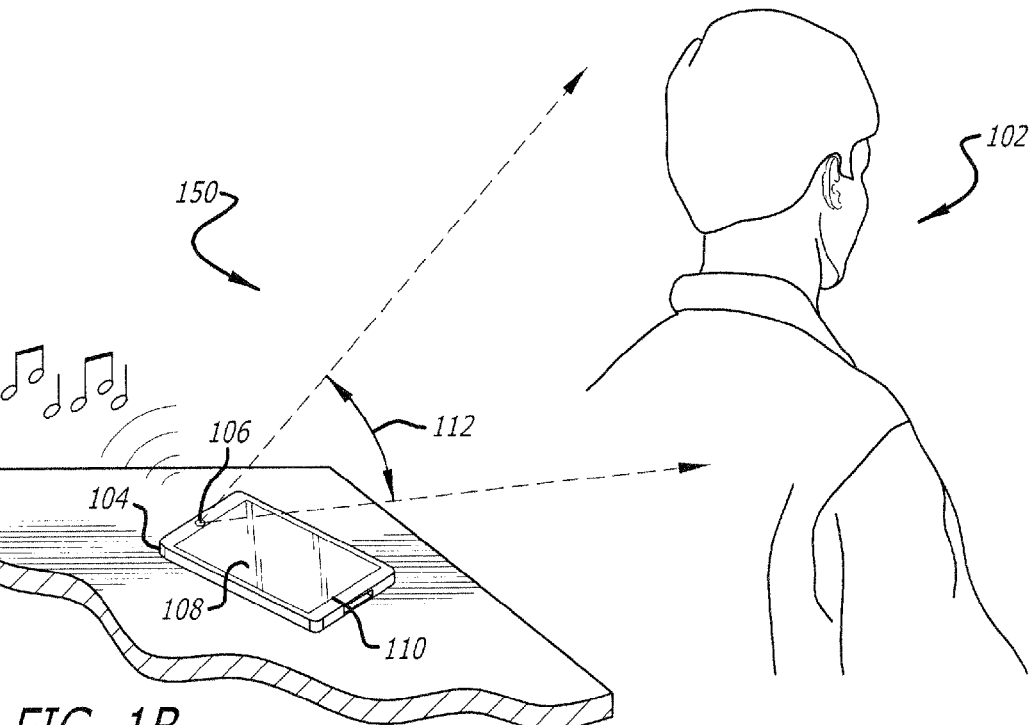

FIG. 1B illustrates an example situation 150 wherein the user 102 moves from his current location and leaves the computing device 104 behind. At substantially the same moment the user is leaving, the device 104 receives a notification. The camera 106 is again activated to capture image data of the scene in front of the camera. In this example, the camera is positioned such that the back of the user is within the field of view of the camera when the camera is triggered. From the captured image data, the device can detect the back of the user and determine that the user is proximate to the device but that the user is not looking at the display screen 108. The device 104 subsequently emits a low or intermediate ringtone or other audio to apprise the user of the device's receipt of the notification. In other embodiments, a device may be configured to vibrate when the user is determined to be proximate to the device but not holding the device or looking at the display screen of the device. In other situations where no user can be detected from captured image data, the device 102 may be configured to emit a ringtone or other audio of a higher volume.

The example situation 100 of FIG. 1A describes one approach for determining whether a user is proximate to a computing device—analyzing image data to detect the presence of the user within the image data. Alternatively, or in addition, user proximity to the device can also be determined using one or more proximity sensors. A proximity sensor typically operates by emitting an electromagnetic field or a beam of electromagnetic radiation and detecting changes in the field or return signal. Proximity sensors can be implemented using capacitive, optical, or ultrasonic sensing technology, structured light, infra-red, and/or laser transceiving systems, as well as other approaches known to those of ordinary skill in the art. In one embodiment, a proximity sensor may project a known pattern of infra-red light (e.g., grid) using one or more infra-red emitters and a user can be determined to be proximate to the device if deformation of the pattern of infra-red light sensed by one or more infra-red detectors corresponds to the shape of the user. In some embodiments, one or more touch sensors can be used at least in part to determine user proximity. For example, a device may include a touchscreen and user interaction with the touchscreen would provide an indication of user proximity. In other embodiments, touch-sensitive materials or components may be dispersed at various locations of a computing device such that the measurements obtained by these touch-sensitive materials or components could indicate whether the user is proximate to the device. In still other embodiments, inertial sensors can detect movement of the device and such movement may correspond to distinct user movement, such as a user gait or a user swinging the device in hand or in a bag. In yet other embodiments, a user's voice can be captured by one or more microphones and the decibel level of the user's voice can be analyzed to determine user proximity to the device. Numerous other approaches can be utilized for determining whether a user is proximate to the device may be utilized and are suggested by the disclosure and teachings provided herein.

Systems and approaches in accordance with various embodiments are able to determine a context of a device using the various sensors of the device and present an indication of an incoming notification based on the determined context. In various embodiments, a computing device may include one or more cameras, microphones, global positioning system (GPS) components, cellular components, Wi-Fi components, Bluetooth® device, radio-frequency (RF) devices, near-field communications (NFC) components, proximity sensors, distance sensors, depth sensors, ambient light sensors, barometers, altimeters, accelerometers, magnetometers, gyroscopes, inclinometers, thermal sensors, touch sensors, pressure sensors, optical sensors, infra-red transceivers, laser transceivers, ultrasonic transceivers, and/or other sensors, transceivers, and mechanisms that can be used to receive a notification from one or more other electronic devices and to determine the device context. In various embodiments, a computing device may include one or more displays, speakers, vibration actuators or mechanisms, uni-colored or multi-colored light-emitting diodes, and/or other output elements that can be used to apprise the user of receipt of the notification.

In various embodiments, a manner of presenting a notification to a user can be determined based on a gaze direction of a user. For example, a visual notification such as a badge, banner, toast, flashing LED pattern, etc. can be presented to the user in lieu of an audio signal or vibration pattern when the user is determined to be gazing towards a display element of a device. In order to determine the gaze direction of a user, a device in at least some embodiments has to determine the relative position of the user relative to the device, as well as dimensions or other aspects of the user at that position. FIG. 2A illustrates an example 200 wherein images are captured and analyzed to determine the relative positions of the user's head and the user's eyes. In a system wherein the algorithm is able to differentiate the user's pupils, the system can also utilize the relative position of the pupils with respect to the eye position. For example, FIG. 2B illustrates a case where the user is looking "left" (or to the user's "right"), such that a center point of each user's pupil is to the left (in the image) of the center point of the respective eye. Similarly, FIG. 2C illustrates a case where the user is looking "up." As can be seen, the positions of the pupils have moved above a center point of the eyes. The position of the pupils can change without the user moving his or her head. Thus the system may be able to, in some embodiments, detect a glance without a change in head position. A system in accordance with one embodiment can take advantage of such information by presenting notifications in a suitable manner to the user.

FIGS. 3A and 3B illustrate an example situation 300 of a user 302 with a computing device 304 that supports context-aware notifications and an example situation 350 of a user 352 with a computing device 354 that supports context-aware notifications, respectively. In the FIG. 3A, the device 304 has been placed in the pants pocket of the user 304 while in FIG. 3B, the device 354 is kept in a purse or bag of the user 352. At certain moments, the devices may each receive a notification upon which each device attempts to determine its context to provide an appropriate indication of the notification to its user. Each of the devices 304 and 354 may include an imaging element, such as a camera, that is first used to determine that the users 302 and 352 are not looking at their respective devices. The devices may then determine that the users are not touching their respective devices via a touchscreen and/or other materials or sensors located on the sides of the respective devices where a user is expected to hold the device. The touch sensitive material can include any appropriate material or component, such as multi-touch force-sensitive resistive sensors, capacitive sensors, optical sensors, resistive sensors, pressure sensors, and the like. One specific touch sensitive component can include an interpolating force-sensitive resistor (IFSR) array touch sensor. By utilizing resistive and capacitive input and analyzing and comparing the two, it becomes possible to detect near-touches, detect light touches, and accurately characterize touches, among other such options. Furthermore, an IFSR array allows for measuring the pressure exerted by a touch on the sensor. An example IFSR array comprises two layers. A first layer incorporates columns of electrodes and a second layer comprises rows of electrodes. These layers are disposed generally perpendicular to one another, such that a grid pattern is formed. A resistive material fills gaps between the electrodes within the layers and acts as a linear resistor. When a user pushes upon the array, the resistance at various intersections between the rows and columns changes. Because of the linear responsiveness of the resistive material, it is possible for a touch controller to interpolate the location of a touch between intersections. Additionally, a magnitude of the applied force is discernible as well. Approaches for determining whether a user is holding or grasping a device is discussed in co-pending U.S. patent application Ser. No. 13/481,249, filed May 25, 2012, entitled "Communication via Pressure Input," which is hereby incorporated by reference herein. The devices may then determine that they are being kept close to the user based on analysis of motion and orientation data captured by inertial sensors of the respective devices corresponding to a user's gait. In various embodiments, a device may emit a low to intermediate audio signal and/or vibrate to apprise the user of the device's receipt of a notification when it is determined that the device is proximate to the user.

In at least some embodiments, a computing device may be configured to further differentiate between when the device is in close contact with a user such that the user may be likely to feel device vibration versus when the device is not close enough with respect to the user such that the user may not likely be able to feel device vibration. For example, in the situation 300 illustrated in FIG. 3A, the device 302 is located in the pants pocket of the user 304 such that the device is in close enough contact that the user may be likely to feel the device vibrating. In contrast, in the situation 350 illustrated in FIG. 3B, the device 352 can be seen in a purse hanging away from the body of the user 354 such that the user 354 may be unlikely to feel the device 352 vibrating. In one embodiment, a computing device may include one or more thermal sensors that can be used to assist in distinguishing between device placement in close enough proximity that the user is likely to feel device vibration versus device placement being too far from the user or there being too many layers of insulation between the user and device such that the user is unlikely to feel device vibration. For example, a device may have a contactless thermal sensor located on each of a front and back surface of a computing device. When the device is placed in a user's pocket or bag, the thermal sensor located on a surface facing away from the user may measure a first temperature and the thermal sensor located on a surface facing the user may measure a second temperature. It is well known that the average temperature of the human body is 98.6° F.±1.0° F. (37.0° C.±0.5° C.). If the ambient temperature is less than 90° F. (about 32° C.), a thermal sensor facing the user may read a temperature higher than the ambient temperature due to proximity of the device to the user. When the difference between the two temperatures exceeds a threshold value, it may be assumed that the device is in close enough contact with the user such that the user may be able to feel device vibration. In such a situation, it may be preferable to inform the user of the notification via device vibration rather than an audio signal.

When the difference between the two temperatures is below the threshold value, it can be assumed that the user may be too far from the device to feel device vibration and an audio signal can be generated to inform the user of an incoming notification. In an embodiment with one thermal sensor, the ambient temperature can be retrieved from a weather service based on the device's location and can be compared to a reading of the thermal sensor to approximate user proximity to the device.

In another embodiment, motion and orientation data can be further analyzed to determine whether a device is located in a user's pocket or a user's bag. For example, when the device is located in a user's pocket, the device is placed such that either the front surface or the back surface of the device is facing the user, the length of the device (e.g., y-axis) is parallel to the user's body, and the width of the device (e.g., x-axis) is perpendicular to the user's body. The device will be closely aligned with the user's leg such that rotational velocity can be measured along the y-z plane of the device that meets threshold values indicating that motion is due to the user's leg movement. In contrast, when a device is placed in a purse or backpack, rotational velocity may fall outside of the threshold values or is otherwise negligible such that motion and orientation data of the device can differentiate when the device is located in a user's pocket versus when the device is located in a purse or backpack. In one embodiment, when the motion and orientation data indicates that the device is more likely to be located in a user's pocket, the device can vibrate upon receipt of a notification. When the motion and orientation data indicates that the device is more likely to be located in a purse or bag, the device can emit an audio signal upon receipt of a notification.

Figures 4A, 4B:
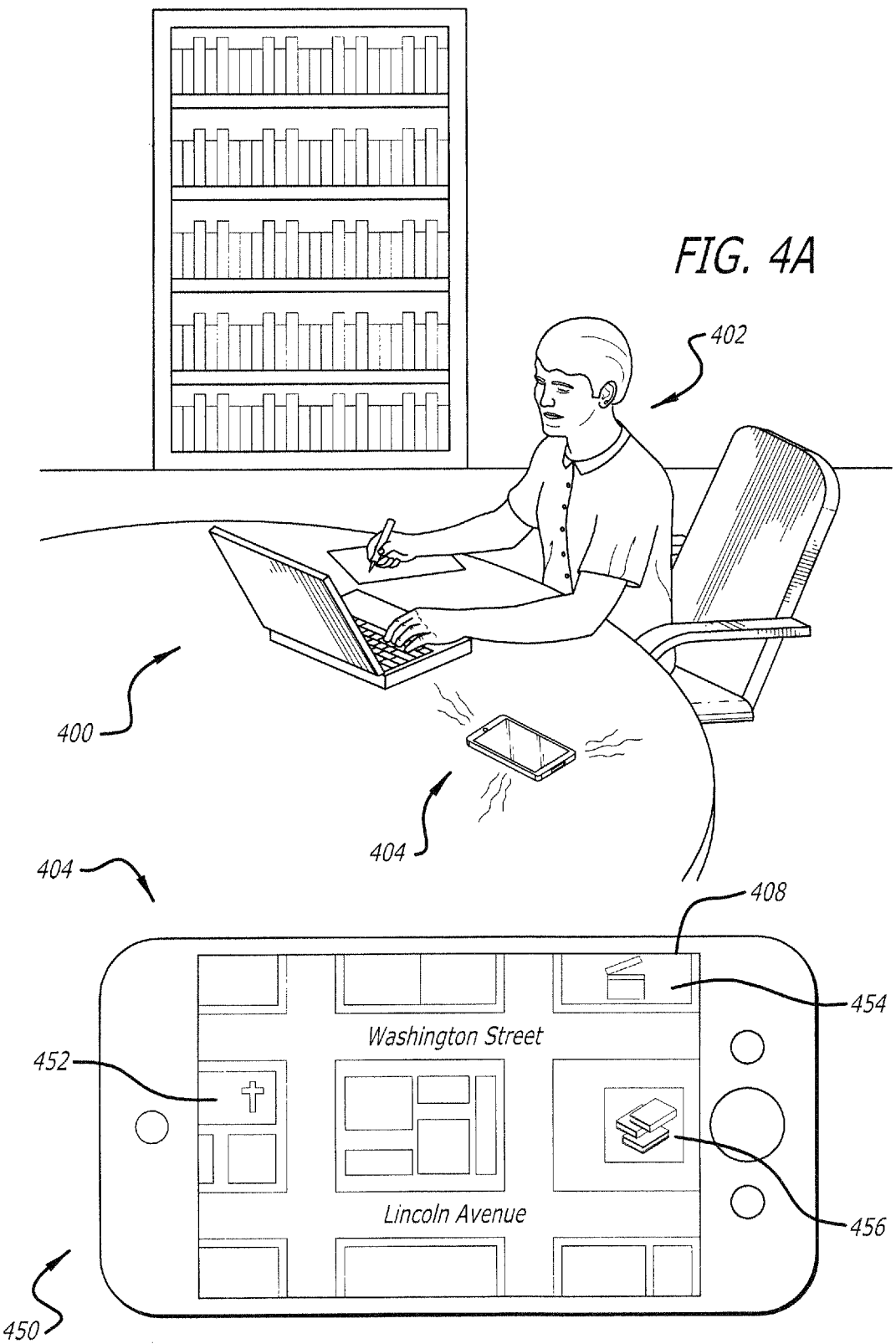
FIGS. 4A and 4B illustrate examples of a personal computing device receiving notifications based on the device's location in accordance with an embodiment.

FIGS. 4A and 4B illustrate examples of computing devices that support context-aware notifications in accordance with various embodiments. In the example situation 400 of FIG. 4A, a user 404 can be seen operating a laptop computer as a portable computing device 402 is situated next to the user. The user is studying in a library and this environment typically requires patrons to remain quiet and turn off portable computing devices or at least mute audio for such devices. For conventional devices, the user may be required to manually change the settings of his phone to turn off a telephone ringer. Further, a computing device's telephone system is not necessarily linked to the device's notification system, and the user may also be required to manually change the settings for his notification system to prevent the device from emitting audio signals upon receiving a notification. More likely than not, however, the user may forget to change the settings for the notification system. Upon receiving a notification to the device, the device may emit an audio signal that could disturb the user and/or others located around the user. In the example situation of 400, however, the device determines its context and causes the device to vibrate instead of emitting an audio signal. In addition, the user may not be required to manually change the settings for his device to deactivate a telephone ringer or audio signals for a notification system. In various embodiments, a device may be able to determine its location from GPS; a cellular phone network system; an NFC system; other short-range beacon systems based on Wi-Fi, RF, IR, Bluetooth®, and other such approaches known to those of ordinary skill in the art. In certain embodiments, image data can be captured and matched against an image database to recognize a user's current specific location or a type of location of the user's current location. For example, a device (or the device in communication with another system) analyzing the captured image data corresponding the situation 400 may recognize that the user is located in a library based on a plurality of bookshelves within the captured image data. In other embodiments when the captured image data includes textual information, such as an address or a name of a location, the textual information can be recognized using one or more optical character recognition (OCR) engines and the recognized textual information can be used to determine the location. Upon determination of the location, the device may recognize that it would be inappropriate to emit audio signals at the location and inform the user of the notification in an appropriate manner, such as by vibrating the device, displaying a visual indicator on a display element, flashing LEDs, or similar such approaches.

In some embodiments, certain types of locations may be designated as "quiet zones," such as libraries, places of worship, movie theaters, schools, etc. When a device determines that it is located at such a location, it can automatically reconfigure itself to vibrate instead of ringing upon receipt of a telephone call and/or vibrate, display a visual indicator on a display element, and/or flash LEDs upon receipt of a notification instead of ringing or emitting other audio signals. Similarly, some types of locations may be designated as "noisy zones," such as bars, clubs, sports arenas or stadiums, etc. At such locations, a device may be automatically reconfigured to vibrate upon receipt of a telephone call or a notification because ambient sound may be so loud as to render audio signals ineffective in obtaining the user's attention. In at least some embodiments, a device may use a microphone to capture ambient sound, determine a decibel level of the ambient sound, and present an indication of the notification based on the decibel level. For example, the device may emit an audio signal that is greater than the decibel level of the ambient sound in one embodiment. In another embodiment, a device may vibrate instead of generating an audio signal based on the determined decibel level.

In various embodiments, a device may be configured to present indications of notifications based on location. For example, a device may present an indication of a location based on certain locations being designated "quiet zones" or "noisy zones." FIG. 4B illustrates an example of such an approach. In the example situation 450 of FIG. 4B, a computing device 404 can be seen displaying a street map on a display screen 408 of the device. In this example, the device 402 is displaying locations on the display screen 408 at which the device is operated in a quiet mode wherein the device vibrates upon receiving a telephone call and vibrates, displays a visual indicator, emits a flashing light pattern, etc., upon receiving a notification. In particular, a device determined to be located at a first location 452 corresponding to a place of worship, a second location 454 corresponding to a movie theater, or a third location 456 corresponding to a library may be operated in "quiet" mode. In some embodiments, a user interface enabling a user to select a location as a "quiet zone" may further enable the user to designate all locations corresponding to the type of that location as "quiet zones," e.g., all places of worship, libraries, and movie theaters may be designated as "quiet zones" at once. "Noisy zones" can be designated using a similar approach.

As mentioned, presentation of indications of notifications may be customized based on senders of the underlying communications corresponding to the notifications and/or by the underlying software such as by user application or operating system. The manner of presenting notifications may be visual (e.g., flashing of LEDs, displaying graphical elements on a display screen), aural (e.g., ringtones), or tactile (e.g., vibration patterns). The manner of presenting notifications may also be based on different patterns and/or intensity levels. Underlying communications may include emails, voicemails, SMS text messages, instant messages, social network status updates, and similar types of communications. Senders of such communications may be associated with certain ringtones, vibration patterns, flashing light patterns, and/or visual indicators on a display element such that the user can become immediately informed of the sender of the underlying communication corresponding to a notification, and respond accordingly. Likewise, underlying user applications or the device's operating system may also correspond to certain notifications, and presentation of the indications of such notifications may be specified, by the user, the application provider, or the device manufacturer. Ringtones may refer to the tone or sound or pattern of tones or sounds (e.g., song notes) made by the computing device in response to receiving a telephone call or notification. Vibration patterns may refer to the vibrations caused by actuators, motors, and other vibration mechanisms incorporated in a computing device. Different vibration patterns can be generated by varying the length and/or intensity of vibrations, and the time between vibrations. In at least some embodiments, a device may incorporate a plurality of vibration actuators or other vibration mechanisms, such as an actuator located along each of an edge of the device. In such devices, vibration patterns may also be varied according to the location of the actuator or other vibration mechanism, such as vibrating clockwise or counterclockwise or alternating between vibrations of top-bottom and left-right pairs of actuators or vibration mechanisms. Flashing light patterns may refer to the flashing of one or more LEDs incorporated by a computing device. Flashing of LEDs can be varied by the length of time an LED is activated and deactivated as well as intensity of the LED. Some LEDs may be capable of flashing different colors, and flashing light patterns can also be varied according to color. Visual indications of notifications can include badges, toasts, banners, in-line interfaces, notification area icons, and other such interfaces displayed on a display element.

Figure 5:
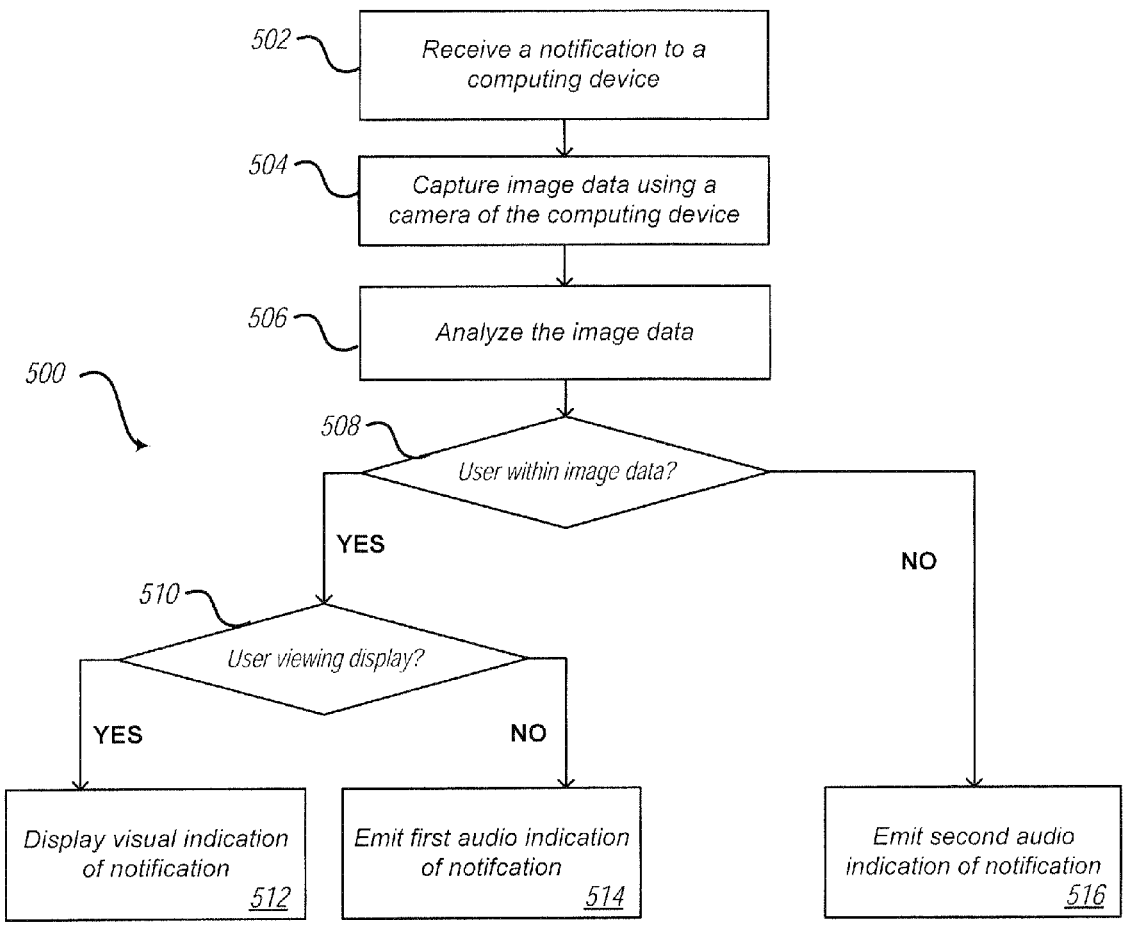
FIG. 5 illustrates an example process for presenting context-aware notifications in accordance with an embodiment.

FIG. 5 illustrates an example process for presenting context-aware notifications in accordance with an embodiment. It should be understood that, for any process discussed herein, there can be additional, fewer, or alternative steps performed in similar or alternative orders, or in parallel, within the scope of the various embodiments unless otherwise stated. In this example, the process is initiated in response to a computing device receiving a notification 502. As mentioned, a notification may correspond to a communication, such as a telephone call, voicemail, email, text message, instant message, or social network status update. A notification may also correspond to newly published content, such as from news, weather, stock market, or sports applications, RSS feeds, blogs, or social networking applications. Further, notifications may inform users of new transactions to user's bank or other financial account, gaming events in a video game, scheduling events, software updates, etc. Upon receipt of the notification, the device may use a camera located on a same surface as a display element of the device to capture image data 504 of subject matter within the field of view the camera. The image data may be analyzed 506 to determine whether a user is present within the image data 508. If a user is located within the image data, the image data may be further analyzed to determine whether the user is gazing towards or viewing the display element 510. If the user is gazing towards or viewing the display element, a visual indication may be displayed on the display element to inform the user of receipt of the notification 512. The visual indication may include a badge, toast, banner, in-line notification, a notification area icon, or other such graphical element. If the user is present within the image data but not gazing towards or not viewing the display element, the device can emit a first audio signal of a low to intermediate volume 514 to alert the user of receipt of the notification. If the user is not present within the image data at all, the device may emit a second audio signal of a higher volume 516 to apprise the user of receipt of the notification. In other embodiments, the device may vibrate to inform the user of receipt of the notification when the user is present within the image data but is determined not to be gazing towards or viewing the display element.

Figure 6A:
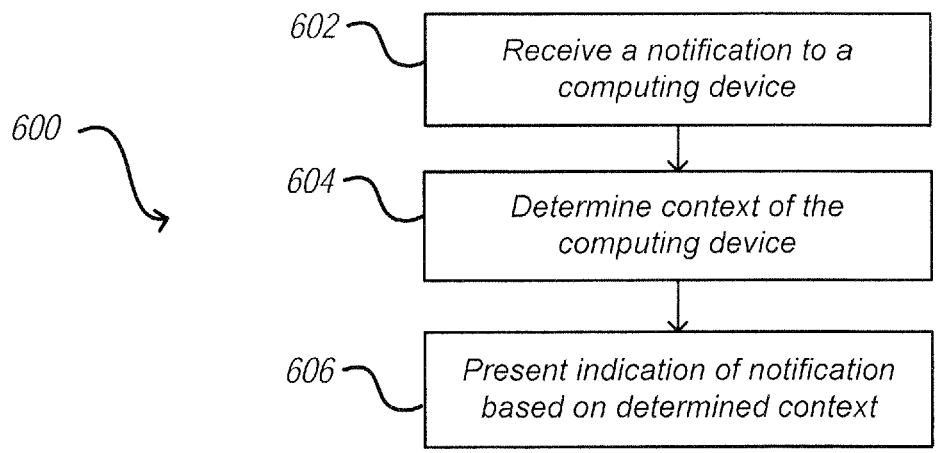
FIGS. 6A and 6B illustrate example processes for presenting context-aware notifications in accordance with various embodiments.
Figure 6B:
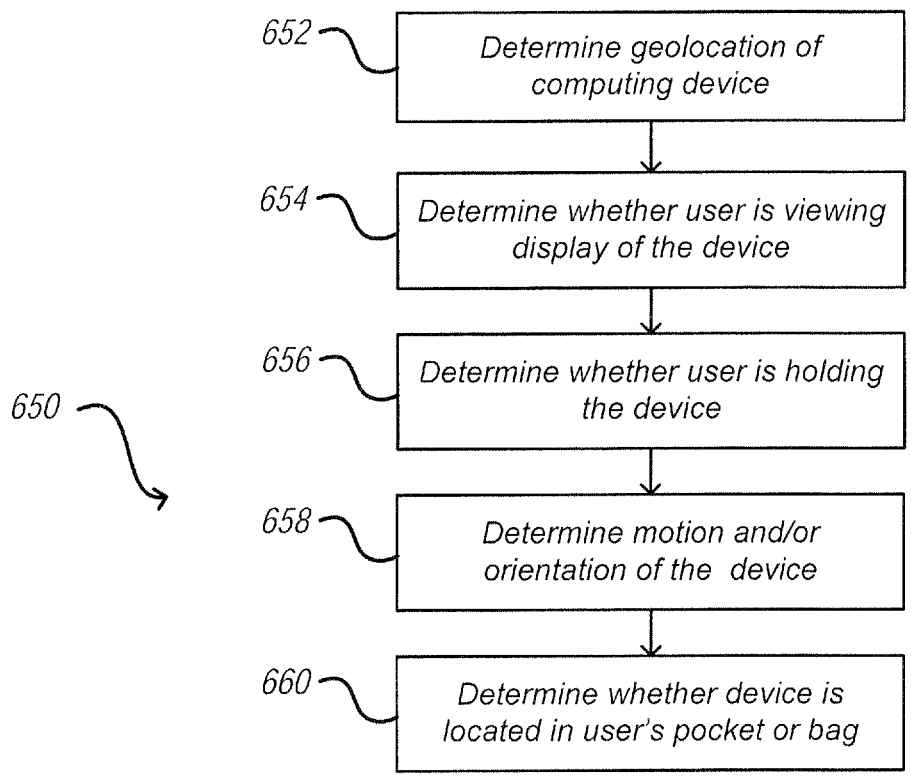

FIG. 6A illustrates an example process for presenting context-aware notifications in accordance with various embodiments. In this example, the process is initiated in response to a computing device receiving a notification 602. Upon receiving the notification, the device may use one or more sensors of the device to determine a context of the device 604. Based on the determined context, the device presents an indication of receipt of the notification 606. Examples of one approach of determining a context of a device is illustrated in FIG. 6B. Although illustrated sequentially here, any of these steps can be used (or not used) to determine device context as in step 604 of FIG. 6A in any particular order or in parallel in various embodiments. As one example, the device may first determine its geographic location 652 to determine whether the location is associated with a particular device behavior. As mentioned, some locations may be designated "quiet zones" wherein receipt of a notification is limited to a visual indicator (e.g., badge, toast, banner, icon, etc. on a display element or flashing LEDs) or tactile indicators (e.g., vibrations). In other situations, a location may be designated a "noisy zone" wherein an incoming notification may be presented using an audio signal louder than the measured level of ambient sound or via vibration. The device behavior may be specified by the user, application provider, service provider, or device manufacturer.

If the location cannot be determined or if there is no particular device behavior specified for the location or the type of the location, the device may capture image data and analyze whether a user is gazing towards or viewing a display element of the device 654 according to the captured image data. If the user is determined to be gazing towards or viewing the display element, an indication of receiving the notification may be limited to a visual indicator. If the user is determined to be within the captured image data but not gazing towards or looking at the device, it is assumed that the user is within the vicinity of the device and the device may vibrate or emit a low to intermediate audio signal to capture the user's attention. If the user is not captured by the camera of the device, touch sensor data can be analyzed to determine whether the user is holding the device 656. A device may include a touchscreen that covers the entirety of a front surface of the device. When the user is grasping the device, the touch sensor data of the touchscreen may be analyzed to determine that the user is holding the device by the front of the device (e.g., touch points correspond to the user's palm) or that the user is holding the device by the back of the device (e.g., touch points correspond to user's fingers along the edges of the touchscreen). In another embodiment, a device may incorporate touch, proximity, and/or pressure sensors along the sides of the device to determine whether the user is holding the device.

If it is determined that the user is not holding the device, other sensor data may be captured to determine a context of the device. For example, motion and/or orientation data can be acquired from one or more inertial sensors 658. The motion/orientation data may indicate that the device is located within a moving vehicle. In one embodiment, the device may try to sync with the vehicle's stereo system via Bluetooth® and present an indication of a received notification via an audio signal through the car's stereo system. In another embodiment, the motion/orientation data may correspond to a user's gait. The device may attempt to differentiate whether the device is located in a user's pocket or a user's bag as she is walking 660. As mentioned, the motion and orientation of the device will include a rotation along the y-z plane as the user is walking when it is located in the user's pocket. When the device is placed in a purse or bag as the user is walking, such rotation is minimal or non-existent. By measuring the rotation velocity of the device as the user is walking, the device can differentiate between placement in a user's pants pocket versus a user's purse or bag. When the device is determined to be located in a user's pants pocket, the device can vibrate to inform the user of an incoming notification. In another embodiment, one or more pressure sensors can be used to measure an amount of pressure or force being applied to the device. In one embodiment, a device may include at least a first pressure sensor that measures force applied to a front surface of the device and a second pressure sensor that measures force applied to a back surface of the device. The device can differentiate from when it is located in a user's pocket based and when it is located in a a bag or backpack based on the readings from the pressure sensors. In some embodiments, a device may be capable of determining force or pressure being applied to each surface of the device. In yet another embodiment, thermal sensors on opposing faces of a computing device can be used to determine whether the device is in proximity to the user's body. Various other approaches can be used to determine a device context based on the disclosure and teachings provided herein.

Figure 7:
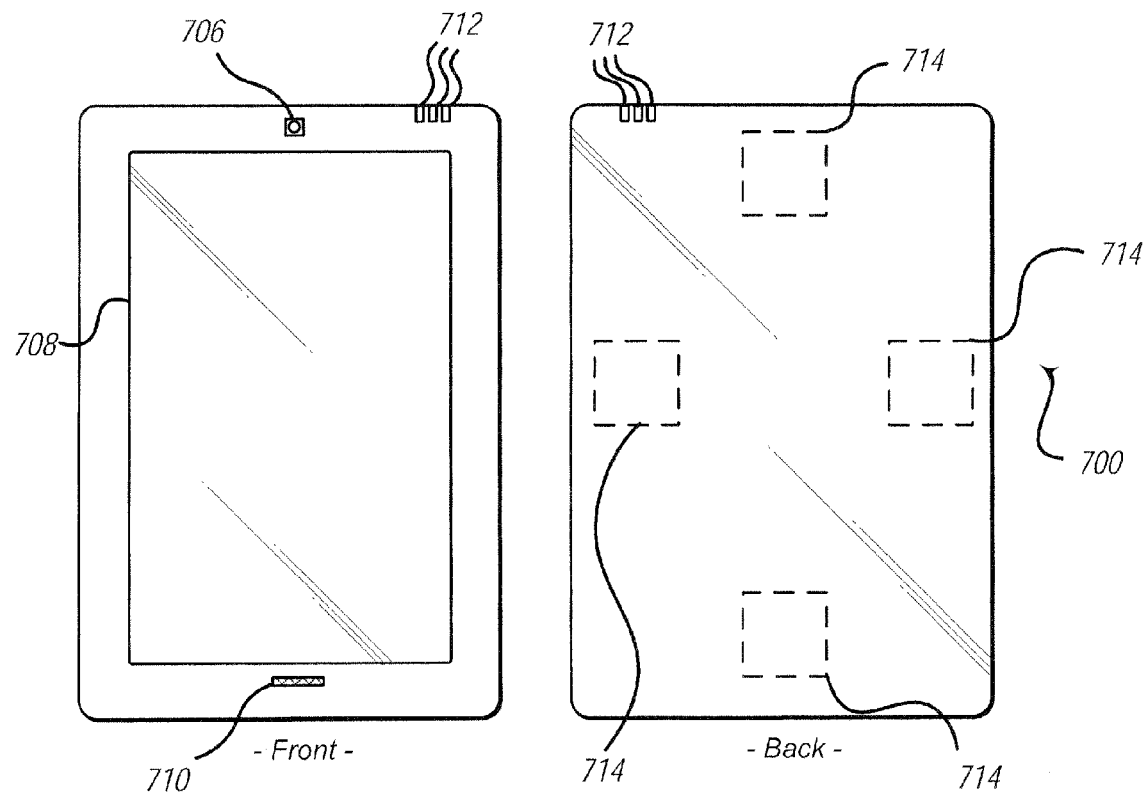
FIG. 7 illustrates an example of a computing device that can be used in accordance with various embodiments.

FIG. 7 illustrates an example computing device 700 that can be used to perform approaches described in accordance with various embodiments. In this example, the device includes at least one camera 706 located on a same front surface of the device as a display element 708, and enabling the device to capture images in accordance with various embodiments. The computing device also includes a speaker 710 for outputting an audio signal and an array of multicolored (red, green, blue) LEDs 712 that can be seen from both the front surface and the back surface of the computing device. A processor (not shown) of the device can control when each of the LEDs are activated and deactivated, a color that an LED emits, and an intensity at which the LED is emitted. From the hack surface of the computing device, the locations of vibration actuators 714 are outlined. The processor of the device can control activation and deactivation of each of the actuators and the intensity of vibration of each of the actuators.

Figure 8:
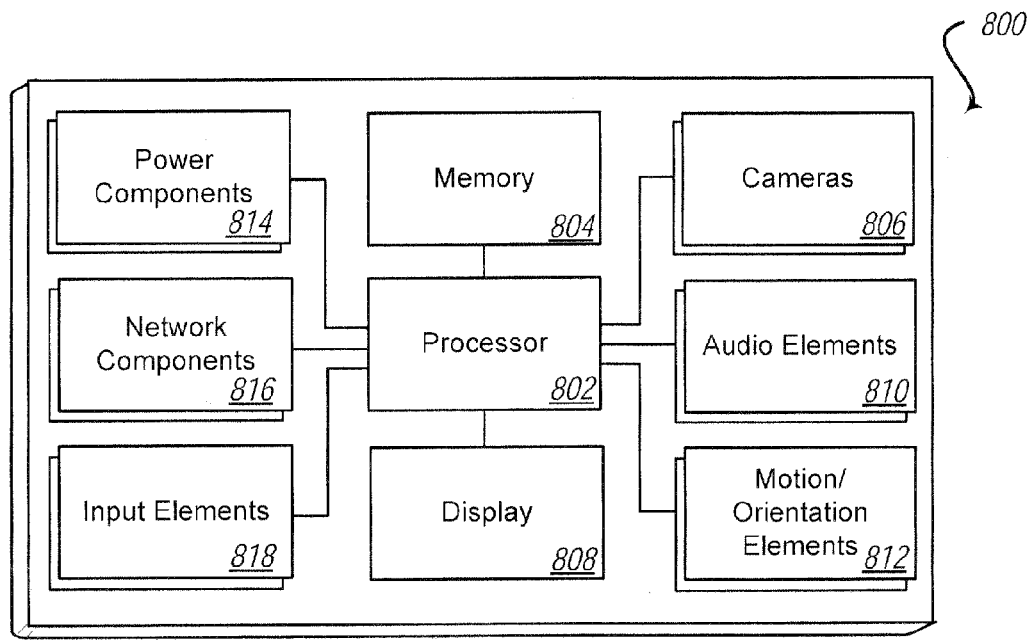
FIG. 8 illustrates an example configuration of components of a computing device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 808, such as a touchscreen, electronic ink (e-ink), organic light emitting diode (OLED), liquid crystal display (LCD), etc., although devices such as portable media players might convey information via other means, such as through audio speakers. In at least some embodiments, the display screen provides for touch or swipe-based input using, for example, capacitive or resistive touch technology. As mentioned, the device in many embodiments will include one or more cameras or image sensors 806 for capturing image or video content. A camera can include, or be based at least in part upon any appropriate technology, such as a CCD or CMOS image sensor having a sufficient resolution, focal range, viewable area, to capture an image of the user when the user is operating the device. An image sensor can include a camera or infrared sensor that is able to image projected images or other objects in the vicinity of the device. Methods for capturing images or video using a camera with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can similarly include at least one audio component, such as a mono or stereo microphone or microphone array, operable to capture audio information from at least one primary direction. A microphone can be a uni- or omni-directional microphone as known for such devices.

The computing device 800 includes at least one capacitive component or other proximity sensor, which can be part of, or separate from, the display assembly. In at least some embodiments the proximity sensor can take the form of a capacitive touch sensor capable of detecting the proximity of a finger or other such object as discussed herein. The computing device also includes various power components 814 known in the art for providing power to a computing device, which can include capacitive charging elements for use with a power pad or similar device. The computing device can include one or more communication elements or networking sub-systems 816, such as a Wi-Fi, Bluetooth®, RF, wired, or wireless communication system. The device in many embodiments can communicate with a network, such as the Internet, and may be able to communicate with other such devices. In some embodiments the device can include at least one additional input device 818 able to receive conventional input from a user. This conventional input can include, for example, a push button, touch pad, touchscreen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include one or more orientation and/or motion sensors 812. Such sensor(s) can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

In some embodiments, the device 800 can include the ability to activate and/or deactivate detection and/or command modes, such as when receiving a command from a user or an application, or retrying to determine an audio input or video input, etc. For example, a device might not attempt to detect or communicate with devices when there is not a user in the room. If a proximity sensor of the device, such as an IR sensor, detects a user entering the room, for instance, the device can activate a detection or control mode such that the device can be ready when needed by the user, but conserve power and resources when a user is not nearby.

In some embodiments, the computing device 800 may include a light-detecting element that is able to determine whether the device is exposed to ambient light or is in relative or complete darkness. Such an element can be beneficial in a number of ways. For example, the light-detecting element can be used to determine when a user is holding the device up to the user's face (causing the light-detecting element to be substantially shielded from the ambient light), which can trigger an action such as the display element to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

In some embodiments, the device 800 can disable features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If speech or voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power. In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the camera and associated image analysis algorithm(s) may be sensitive enough to distinguish between the motion of the device, motion of a user's head, motion of the user's eyes and other such motions, based on the captured images alone. In other embodiments, such as where it may be desirable for an image process to utilize a fairly simple camera and image analysis approach, it can be desirable to include at least one orientation determining element that is able to determine a current orientation of the device. In one example, the one or more orientation and/or motion sensors may comprise a single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using a camera of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 9:
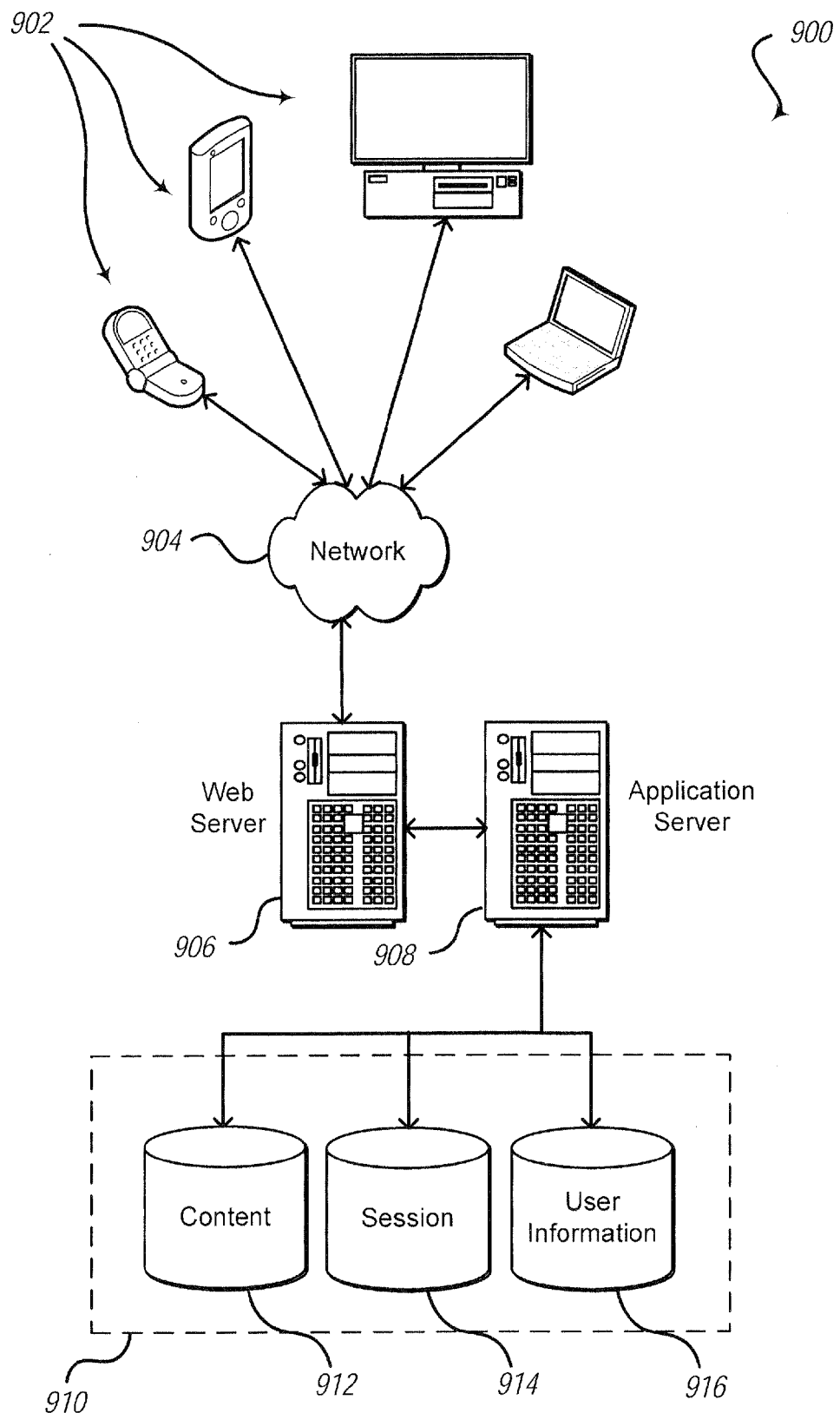
FIG. 9 illustrates an example environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. it should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   one or more processors;
   a display element;
   one or more cameras;
   one or more additional sensors; and
   memory including instructions that, upon being executed by the one or more processors, cause the computing device to:
   obtain a first notification to be presented to a user of the computing device;
   capture one or more first images using the one or more cameras;
   determine a first gaze direction of the user relative to the display element based at least in part upon the one or more first images;
   capture first sensor data using the one or more additional sensors;
   determine whether the user is proximate to the computing device based at least in part upon the first sensor data;
   present a visual indication associated with the first notification based at least in part upon determining that the first gaze direction of the user is directed to the display element and the user is proximate to the computing device according to the first sensor data;
   obtain a second notification to be presented to the user;
   capture one or more second images using the cameras;
   determine a second gaze direction of the user relative to the display element based at least in part upon the one or more second images;
   capture second sensor data using the one or more additional sensors;
   determine whether the user is proximate to the computing device based at least in part upon the second sensor data; and
   present at least one of a first aural indication associated with the second notification or a first tactile indication associated with the second notification based at least in part upon determining that the second gaze direction of the user is directed away from the display element and the user is proximate to the computing device according to the second sensor data.

2. The computing device of claim 1, wherein the instructions upon being executed further cause the computing device to:
   present at least one of a second aural indication associated with the second notification or a second tactile indication associated with the notification based at least in part upon determining that the second gaze direction of the user is directed away from the display element and the user is not proximate to the computing device.

3. The computing device of claim 2, wherein the at least one of the first aural indication associated with the second notification or the first tactile indication associated with the second notification differs from the at least one of the second aural indication associated with the second notification or the second tactile indication associated with the second notification according to at least one of pattern, duration of time, or intensity level.

4. A method for presenting information, comprising:
   obtaining a first notification to be presented on a computing device;
   determining a first gaze direction of a user relative to a display element of the computing device;
   presenting a visual indication associated with the first notification based at least in part upon determining that the first gaze direction of the user is directed to the display element;
   obtaining a second notification to be presented on the computing device;
   determining a second gaze direction of the user relative to the display element; and
   presenting at least one of a first aural indication associated with the second notification or a first tactile indication associated with the second notification based at least in part upon determining that the second gaze direction of the user is directed away from the display element.

5. The method of claim 4, further comprising:
determining whether the user is proximate to the computing device,
wherein the visual indication associated with the first notification is further based at least in part upon determining that the user is proximate to the computing device, and
wherein the at least one of the first aural indication associated with the second notification or the first tactile indication associated with the second notification is further based at least in part upon determining that the user is proximate to the computing device.

6. The method of claim 5, further comprising:
presenting at least one of a second aural indication associated with the second notification or a second tactile indication associated with the second notification based at least in part upon determining that the second gaze direction of the user is directed away from the display element and the user is not proximate to the computing device.

7. The method of claim 6, wherein the at least one of the first aural indication associated with the second notification or the first tactile indication associated with the second notification differs from the at least one of the second aural indication associated with the second notification or the second tactile indication associated with the second notification according to at least one of pattern, duration of time, or intensity level.

8. The method of claim 4, further comprising:
capturing at least one of motion data or orientation data using one or more inertial sensors of the computing device; and
determining a location of the computing device relative to the user based at least in part upon the one of the motion data or the orientation data, the location corresponding to one of a hand of the user, a pocket of the user, or a bag of the user,
wherein the visual indication associated with the first notification is further based at least in part upon determining that the location corresponds to the hand of the user and the at least one of the first aural indication associated with the second notification or the first tactile indication associated with the second notification is further based at least in part upon determining that the location corresponds to the pocket of the user or the bag of the user.

9. The method of claim 4, further comprising:
capturing at least one temperature using at least one thermal sensor of the computing device; and
comparing the at least one temperature to a threshold temperature,
wherein presenting the at least one of the first aural indication associated with the second notification or the first tactile indication associated with the second notification is further based at least in part upon determining that at least one temperature exceeds the threshold temperature.

10. The method of claim 4, further comprising:
determining a force being applied to at least one surface of the computing device using at least one pressure sensor of the computing device; and
comparing the force being applied to a threshold force,
wherein presenting the at least one of the first aural indication associated with the second notification or the first tactile indication associated with the second notification is further based at least in part upon determining that the force being applied exceeds the threshold force.

11. The method of claim 4, further comprising:
determining a geographical location of the device using at least one of a camera, a GPS component, a cellular phone network component, a Wi-Fi component, a radio frequency component, an infra-red transceiver, or a Bluetooth component of the computing device, the geographical location corresponding to a noise level,
wherein presenting the at least one of the first aural indication associated with the second notification or the first tactile indication associated with the second notification is further based at least in part upon the noise level.

12. The method of claim 4, further comprising:
determining ambient noise level using at least one microphone of the computing device; and
comparing the ambient noise level to a threshold noise level,
wherein presenting the at least one of the first aural indication associated with the second notification or the first tactile indication associated with the second notification is further based at least in part upon determining that the ambient noise level exceeds the threshold noise level.

13. The method of claim 5, wherein determining whether the user is proximate to the computing device is based at least in part upon sensor data captured using one or more sensors of the computing device, the one or more sensors including one or more cameras, touch sensors, resistive sensors, capacitive sensors, optical sensors, pressure sensors, inertial sensors, accelerometers, gyroscopes, microphones, thermal sensors, multi-touch force-sensitive resistive sensors, capacitive sensors, optical sensors, resistive sensors, pressure sensors, or interpolating force-sensitive resistive array (IFSR) touch sensors.

14. The method of claim 4, wherein presenting the visual indication associated with the first notification includes at least one of displaying one or more graphical elements on the display element flashing one or more light-emitting diodes (LEDs) of the computing device, and presenting the at least one of the first aural indication associated with the second notification or the first tactile indication associated with the second notification includes at least one of emitting one or more audio signals using one or more speakers of the computing device or vibrating the computing device using one or more vibration elements of the computing device.

15. The method of claim 14, further comprising:
selecting between at least one of a first pattern, a first duration, or a first intensity level and a respective second pattern, a second duration, or a second intensity level for displaying the one or more graphical elements on the display element, flashing the one or more LEDs, emitting the one or more audio signals, or vibrating the computing device.

16. A non-transitory computer-readable storage medium storing instructions for presenting information, the instructions, upon being executed by one or more processors, causing the one or more processors to:
obtain a first notification to be presented on a computing device;
determine a first context of the computing device using one or more sensors of the computing device, the first context including at least first information corresponding to a first gaze direction of a user in relation to a display element of the computing device;
present a visual indication associated with the first notification based at least in part upon the first context including the first information corresponding to the first gaze direction of the user being directed to the display element;

obtain a second notification to be presented on the computing device;

determine a second context of the computing device using the one or more sensors of the computing device, the second context including at least second information corresponding to a second gaze direction of the user in relation to the display element; and present at least one of a first aural indication associated with the second notification or a first tactile indication associated with the second notification based at least in part upon the second context including the second information corresponding to the second gaze direction of the being directed away from the display element.

17. The non-transitory computer-readable storage medium of claim 16, wherein:

the one or more sensors includes one or more cameras, touch sensors, resistive sensors, capacitive sensors, optical sensors, pressure sensors, inertial sensors, accelerometers, gyroscopes, microphones, or thermal sensors; and the first context and the second context of the computing device further including, respectively, third information and fourth information corresponding to whether the user is proximate to the computing device.

18. The non-transitory computer-readable storage medium of claim 17, wherein the instructions upon being executed further cause the computing device to:

present at least one of a second aural indication associated with the second notification or a second tactile indication associated with the second notification based at least in part upon the second context including the second information that the second gaze direction of the user is directed away from the display element and the fourth information corresponding to the user not being proximate to the computing device, wherein the visual indication associated with the first notification is further based at least in part upon the third information corresponding to the user being proximate to the computing device, and wherein the at least one of the first aural indication associated with the second notification or the first tactile indication associated with the second notification is further based at least in part upon the fourth information corresponding to the user being proximate to the computing device.

19. The non-transitory computer-readable storage medium of claim 16, wherein the visual indication associated with the first notification includes at least one of one or more graphical elements on the display element or flashes of one or more light-emitting diodes (LEDs) of the computing device, and the at least one of the first aural indication associated with the second notification or the first tactile indication associated with the second notification includes at least one of one or more audio signals from one or more speakers of the computing device or vibrations of the computing device from one or more vibration elements of the computing device.

* * * * *